United States Patent Office 2,970,062
Patented Jan. 31, 1961

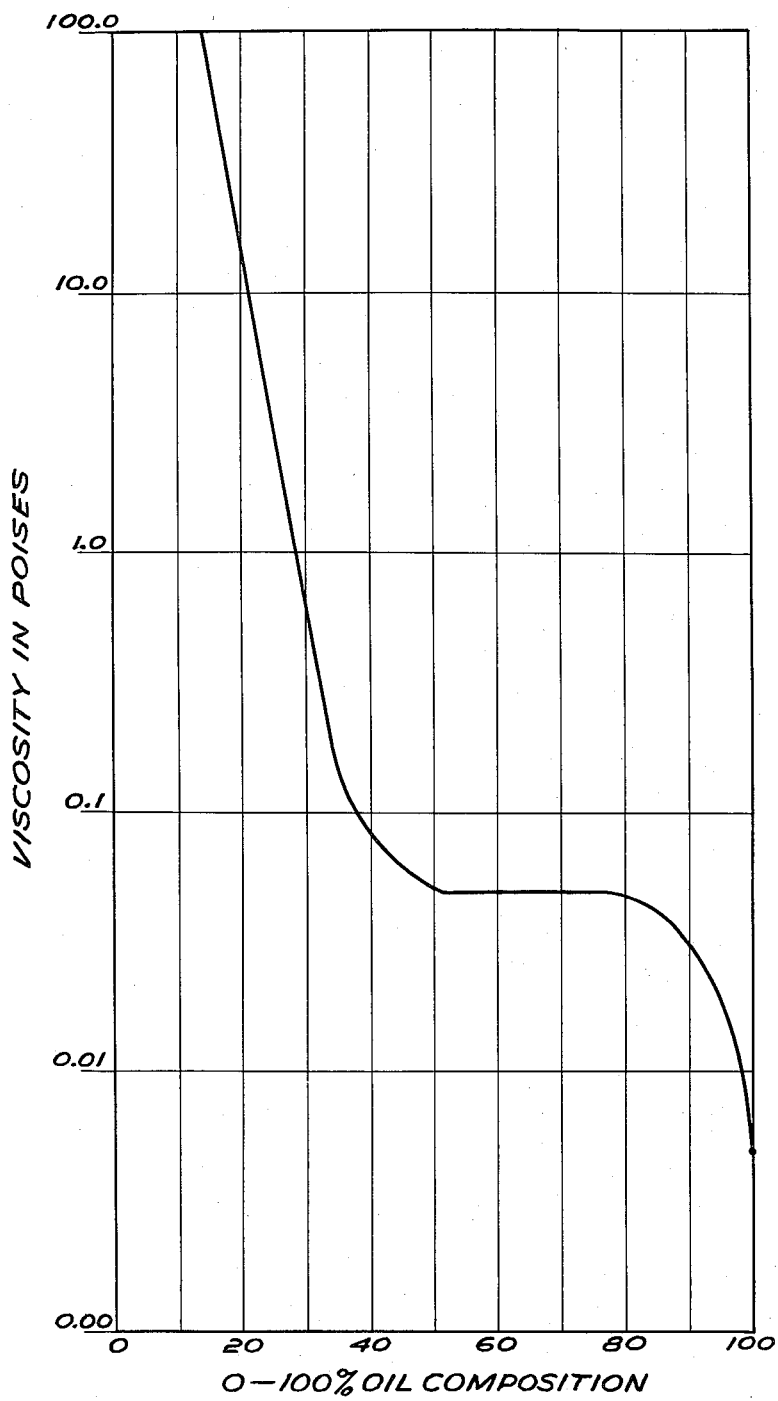

2,970,062
URETHANE MODIFIED DRYING OIL

Hans M. Hauge, Depew, and Joseph A. Pawlak, Buffalo, N.Y., assignors to Spencer Kellogg and Sons, Inc., Buffalo, N.Y.

Filed Oct. 29, 1958, Ser. No. 770,372

10 Claims. (Cl. 106—123)

The present invention relates to drying oils and semi-drying oils modified with a polyisocyanate polyol reaction to produce an intermediate urethane modified oil product which is nongelling and which possesses a substantially constant viscosity with time and which is an excellent drying oil.

Heretofore it has been suggested to react drying oils with polyisocyanates and to produce coatings and adhesives. See, for instance, Pratt et al. No. 2,358,475. However, the reactivity of the isocyanate group is such that gelled and unstable products readily form.

It is an object of the present invention to prepare urethane modified ethylenically unsaturated vegetable oils by means of reaction with a polyisocyanate of a diol ester of the oil wherein the end product contains either substantial neutrality with respect to free and unreacted hydroxyl groups or isocyanate groups, or both.

It is also an object of the present invention to prepare polyisocyanate modified drying oils and semi-drying oils of the urethane type which can be used in the preparation of coatings and adhesives and which are stable with time with respect to viscosity.

In accordance with the broad aspects of the present invention, an ethylenically unsaturated vegetable oil of the so-called drying or semi-drying type is first partially alcoholized with a polyhydroxy alcohol such as pentaerythritol, tripentaerythritol, and other normally employed polyhydroxy alcohols to produce a diol ester thereof and the resultant ester reacted by contact with a controlled and restricted amount of polyisocyanate, more specifically, a diisocyanate. In addition to the alcohols mentioned, one may employ such polyols as trimethylolpropane, trimethylolethane and glycerine.

The alcoholysis is for the purpose of introducing reactive hydroxyl groups into the triglycerides which constitute the drying and semi-drying oils and substantially to prepare a diol ester therefrom. The alcoholysis is performed with an alcohol which is at least trifunctional in nature. The tetrafunctional alcohol, pentaerythritol, is excellent for this purpose although other polyfunctional alcohols, as indicated, are suitable.

It will be understood that the so-called diol esters mentioned above are, in fact, mixed esters and could be prepared by the reaction between selected amounts of the free fatty acid and the desired polyhydroxy alcohol.

Economies, however, will dictate the alcoholysis of the vegetable oil in the usual manner, by heating at 420 to 550° F. and probably in the presence of a conventional catalyst, as for instance, a catalytic amount of alkali or lead oxide. In general, about 7% to 25% of the polyhydric alcohol, based on oil, is employed and preferably 13% to 17% in the case of pentaerythritol, based on the weight of the oil. The alcoholized product, i.e., the diol ester suitable for use, possesses a hydroxyl value in the range 120 to 260, and in the case of pentaerythritol, of about 170 to 185.

The so alcoholized oil is then heated with an amount of diisocyanate equivalent to the hydroxyl value possessed by the oil, the reactivity being one hydroxyl group per one isocyanate group. The reaction is generally continued until the isocyanate number falls to a figure indicating not more than 1% free —NCO.

In the performance of the reaction between the diol ester and the polyisocyanate, the reactants are mixed and reaction permitted to proceed by contact at a relatively low temperature until a substantial part of the isocyanate radical has been combined with the hydroxyl radicals of the system. Although it is not a requirement of the invention, it is preferred to carry out the reaction between the alcoholized oil and the polyisocyanate in the presence of an inert solvent. The inert organic solvent will preferably be any of the so-called paint and varnish solvents and so may be an aromatic solvent, as for instance xylene and its related hydrocarbons or so-called mineral spirits, the reaction proceeding more rapidly in the latter than in the former.

For purposes of control it will be found preferable to add the diol ester slowly and over about a two-hour period to a solution of the polyisocyanate in part or all of the inert solvent and to perform the admixture at a relatively low temperature, as for instance at a temperature not exceeding about 130° F. Since the reaction is an exothermic one and since it is desired, in accordance with the present invention, initially to obtain reaction between the diol ester and the polyisocyanate, it may be found necessary to cool the reaction mixture which is then maintained at temperatures below 130° F. until substantial reaction between the hydroxyl groups of the mixed ester and the isocyanate groups of the polyisocyanate have combined to produce a urethane. In general, the reaction mixture will be maintained for an additional three hours at a temperature below about 130° F. at which time the percent of isocyanate radical will be found to be less than about 20% of the unreacted isocyanate and is generally in the neighborhood of 1½ to 5%, based on the weight of the reaction mixture.

Such a product however is not particularly stable with time and in accordance with the principles of the present invention the reaction mixture is thereafter heated at a temperature considerably in excess of 130° F., as for instance in the neighborhood of 250° F. or higher, until such time as there is substantially no free isocyanate, that is —NCO.

The urethane modified oils so produced possess a substantially constant viscosity, provided these are prepared from 40 to 85% oil, do not gel during or after the reaction and are therefore shelf stable and may be employed as a vehicle in the production of usual coating materials, as for instance clear finishes or a protective coating compounded with pigments, i.e., as a vehicle of general use in the varnish and paint trade. An important feature of this invention therefore is the possibility of pigmenting the modified oils of the present invention by reason of the absence therein of free isocyanate groups.

In the practice of the invention therefore, the amount of polyol and polyisocyanate should be such that the resultant product is from 40% to 85% oil, based on total reactive mixture and wherein the relation between isocyanate and free hydroxyl is 1:1, i.e., substantial neutrality. This ratio is preferably controlled by determination of the isocyanate number and the hydroxyl number.

In the drawing, the single figure is a graph in an idealized system of the present invention in which the ordinate is viscosity in poises and the abscissa the percent oil in a reacted urethane-oil product.

Referring more particularly to the graph, it will be noted that as the percent of oil is decreased in a particular oil-urethane system, the viscosity of the final reaction product at oil length below about 40% increases and is substantially directly proportionally to the decrease in oil content until a viscosity substantially of infinity is present in such product indicating that the product has gelled. At oil length above 85%, little modifying effect of the urethane is noted.

In accordance with the principles of the present invention therefore, it is desired to produce a urethane modified ethylenically unsaturated vegetable oil having drying properties and substantially constant viscosity, which can be done by producing an end product containing more than 40% and less than 85% vegetable drying oil.

The other variable found in accordance with the present invention to produce additional reactivity in the system is the presence of unreacted functional groups, i.e., hydroxyl and isocyanate and hence these functional groups are kept as substantial neutrality.

In accordance with the present invention the end product may not contain both unreacted isocyanate groups and unreacted hydroxyl groups; the system may contain free or unreacted isocyanate groups or free and unreacted hydroxyl groups but not both and to this end the initial charge should contain a ratio of isocyanate to hydroxyl of between 0.9 to 1.3 on an equivalent ratio basis.

As indicated above, the reaction is a general one and may be employed for the modification of ethylenically unsaturated vegetable oils as for instance drying oils such as linseed oil, and semi-drying oils such as soybean oil as representative of the groups, it being understood that oils such as safflower oil, sesame oil, poppyseed oil, sunflower oil, perilla oil, corn oil, can be employed.

The resultant modified oils may be employed as vehicles in the production of paints, varnishes and adhesives. The resultant modified oils are excellent vehicles for coatings since they possess a good stability, fast dry time, good color, generally in the neighborhood of 4 to 5 on the Gardner scale, and result in the production of films which are weather resistant, extremely hard, and possess excellent pigment carrying characteristics. Usual so-called driers may be added to the final modified oil to shorten the cure time.

The following examples are given as illustrative of the invention and are not deemed to be limitative thereof.

Example 1

This example illustrates the production of a urethane modified drying oil prepared from alcoholized linseed oil and tolylene diisocyanate at what might be called a 70% oil length. 1400 parts by weight of alkali refined linseed oil (Superior linseed oil) and 214 parts by weight of pentaerythritol were heated for two hours at 480° F. in the presence of 0.32 part by weight of caustic soda, in order to effect alcoholysis of the triglycerides of the oil and to produce a diol ester.

The hydroxyl number of the so alcoholized oil was determined in the standard way and found to be 189.9 which indicated the presence of 3.38 gram equivalent of hydroxyl in 1000 grams of oil. The required equivalence of tolylene diisocyanate was therefore 3.38×87, or 295.8 grams tolylene diisocyanate per thousand grams of oil.

In order to prepare the urethane modified oil at a solids content in the finished product of 50%, 295.8 grams tolylene diisocyanate was charged into a three-necked flask containing thermometer, stirrer, reflux condenser and separatory funnel together with 647.9 grams of xylene (½ the total amount of solvent), the mixture heated gently to 100° F., 1000 grams of the above alcoholized oil then added slowly over a two hour period, the temperature being held at 100° F. Agitation was thereafter continued and the temperature maintained below 130° F. for three hours at which time the remainder of the solvent (647.9 grams xylene) was added and the mixture then heated to about 250° F. for ½ hour and then cooled and filtered.

The viscosity of the product was found to be A (Gardner-Holdt); the nonvolatiles, 49.5%; the isocyanate value, as determined by a modification of the procedure of Stag, Analyst 71, 557, (1946), by employing dibutyl amine as the analytical reagent, was found to be 0.01%, showing substantially no free isocyanate.

After 18 months the viscosity of the product had not changed.

Example 2

In this example, a 75% oil length product was prepared from alkali refined linseed oil (Superior linseed oil) by alcoholizing the oil in the manner indicated above in Example 1, but with trimethylolethane employing 321 grams of that polyhydric alcohol for each 3,000 grams of oil. This alcoholized oil possessed an hydroxyl value of 136.8 indicating that 212 grams of tolylene diisocyanate would be the equivalent amount of isocyanate for the hydroxyl present in 1000 grams of alcoholized oil.

After mixing and reacting the alcoholized oil and the tolylene diisocyanate in the manner indicated above, namely, at a temperature below 130° F. and preferably at about 100° F., for the major part of the reaction time, followed by an increase in temperature to a temperature just below the boiling point of the solvent, there was produced an end product possessing a viscosity of A4 and an isocyanate value of zero. The nonvolatile content in this instance was 51.13%. As was the case with the product of Example 1, the reaction product of this example possessed a constant and stable viscosity with time.

Example 3

In order to prepare a 70% oil length safflower oil urethane, 700 grams of safflower oil were alcoholized with 107 grams of pentaerythritol producing a product requiring 280 grams of tolylene diisocyanate for each 1000 grams of alcoholized oil and when so reacted, as indicated in Examples 1 and 2 above, an end product was obtained having a viscosity of A, a non-volatile content of 50.49% and an isocyanate value of 0.0%.

Example 4

In order to produce an 80% oil length urethane intermediate from refined soybean oil, 800 grams of alkali refined soybean oil was first alcoholized with 71.2 grams pentaerythritol as outlined above, producing a product with an hydroxyl value of 125.3 indicating that 194 grams of tolylene diisocyanate should be employed to react with the hydroxyl in 1000 grams of the so-alcoholized oil in order to obtain equivalent amounts of hydroxyl and isocyanate.

When these quantities were reacted as indicated above, that is, first by heating the reactants at a temperature lower than 130° F. and preferably by the addition of the alcoholized oil to the isocyanate and then subsequently finishing off the reaction at an elevated temperature below the boiling point of any solvent present in the mixture, there results a stable product, the viscosity of which is constant. As in the previous examples, the initial reaction was performed at about 75% solids content for the low temperature portion of the reaction, and at 50% solids content when the reaction was completed at the higher temperature. The end product possessed a viscosity of A, a nonvolatile content of 50.5% and an isocyanate value of zero.

Example 5

It is possible also to prepare these products in the presence of mineral spirits rather than aromatic spirits, as illustrated heretofore. In this example the products were the same as Example 1 except that the reaction was carried out at a 60% solids content, that is, 40% solvent, wherein all of the solvent was present in the reaction flask initially. In this reaction the temperature was held at 130° F. throughout, and was raised to 250° F. for ½ hour to complete the reaction.

The resultant end product possessed a nonvolatile content of 60.49, an isocyanate number of zero, and a Gardner-Holdt viscosity of Y plus ½. Like the previous products, the viscosity was stable.

*Example 6*

In this example, a 70% tall oil fatty acid ester urethane was prepared by first esterifying 849 grams of distilled tall oil fatty acids with 95 grams of glycerine and 134.5 grams pentaerythritol by heating for several hours at 450° F. in the presence of 0.22 gram sodium hydroxide. The resulting diol ester possessed a hydroxyl value of 188.9, thus requiring 292 grams tolylene diisocyanate per thousand grams of the thus prepared tall oil ester for reaction with the hydroxyl thereof.

500 grams of this tall oil diol ester was heated at 120° F. with 146 grams of toluene diisocyanate and 343 grams of xylene for about 4 hours, the ester being added slowly and in small increments to the xylene isocyanate mixture, after which time an additional 243 grams of xylene was added and the mixture heated to 250° F. for ½ hour.

The product had a nonvolatile content of 49.5, an isocyanate value of 0.02, and a viscosity of C.

It will be noted that in all of the examples a mixed ester is the reactant with the polyisocyanate. The mixed ester therefore is the basis for the isocyanate reaction by reason of the presence therein of reactive hydrogen in the hydroxyl groups of such esters. Since tolylene diisocyanate is currently available in dependable purity and composition at a relatively low price, the examples herein illustrate the use of that particular diisocyanate. It will be understood however that arylene diisocyanates generally can be employed in this reaction, keeping in mind that the above examples are employed for purposes of illustration rather than for purposes of limitation. Suitable polyisocyanates for use in preparing the urethane modified oils of the present invention are listed in U.S. Patent 2,733,261.

*Example 7*

2800 parts of alkali refined linseed oil, 430 parts tripentaerythritol, and 0.65 part NaOH catalyst were heated to 480° F. with good agitation under inert gas. The reaction mixture was held at this temperature for 2 hours. Upon cooling, the partial ester was found to have a hydroxyl value of 145.3.

500 parts of this ester was added over a 2 hour period to the stoichiometric amount of tolylene diisocyanate, namely 113 parts and dissolved in 407 parts of mineral spirits. During the addition and for 3 hours thereafter, the reaction mixture was held at 100° F. The temperature was then increased to 250° F. and held at that temperature for ½ hour. Upon cooling, the product had a viscosity of X-¼ (Gardner-Holdt) and an unreacted isocyanate of 0.03% NCO. With conventional driers this vehicle produced a film which set in one hour and had "dried through" in 1½ hours.

*Example 8*

Trans-esterification of linseed oil by glycerol was effected by heating 2800 parts by weight of the oil with 386 parts of glycerol for two hours at 480° F. in the presence of 0.58 part of caustic soda. The cooled partial ester had a hydroxyl value of 201.

500 parts of this ester was added slowly at a moderate temperature to 225 parts of diphenylmethane, 4,4-diisocyanate dissolved in 725 parts of toluene. The temperature was maintained over the two hour addition period and for three hours thereafter, the reaction being completed at 150° F.

The final oil product as so modified had a viscosity of 11,040 stokes. Upon addition of 0.06% cobalt as naphthenate and somewhat further dilution with toluene, a film was obtained from the final product which set immediately and dried through in 30 minutes.

In general, the percent of free isocyanate radical present in the reaction mixture prior to the time it is subjected to the second stage of heating, that is, at the elevated temperature, should be less than about 20% of the original isocyanate present.

The end product in every case is a stable urethane modified ethylenically unsaturated vegetable oil having drying properties and wherein the oil length is from 40% to 85% oil suitable for use as a vehicle in preparation of coatings such as paints and varnishes.

It will be understood that mixtures of polyols may be employed as the esterifying agent for the vegetable oil, as for instance a mixture of pentaerythritol and glycerol.

What is claimed is:

1. The method comprising (a) heating an ethylenically unsaturated vegetable oil selected from the group consisting of drying oils and semidrying oils at a temperature in the range 420° F. to 550° F. with 7% to 25% by weight of an aliphatic alcohol which is at least trifunctional, until alcoholysis has occurred and ester interchange to form a diol ester is completed, said diol ester having a hydroxyl value in the range 120 to 260, (b) then reacting the diol ester modified ethylenically unsaturated oil thus produced with a polyisocyanate by contact at a temperature below about 130° F., the amount of polyisocyanate employed being substantially equivalent to the hydroxyl of the oil diol ester, until there is less than 20% of the polyisocyanate unreacted and thereafter heating the mixture to above 130° F. until there is less than 1% unreacted polyisocyanate.

2. The method comprising (a) heating an ethylenically unsaturated vegetable oil selected from the group consisting of drying oils and semidrying oils at a temperature in the range 420° F. to 550° F. with 7% to 25% by weight of an aliphatic alcohol which is at least trifunctional, until alcoholysis has occurred and ester interchange to form a diol ester is completed, said diol ester having a hydroxyl value in the range 120 to 260, (b) then slowly adding the diol ester modified ethylenically unsaturated oil thus produced to a diisocyanate dissolved in an inert organic solvent and at a temperature of less than about 130° F. whereby reaction by contact therebetween occurs and continuing the reaction at less than 130° F. until not more than 20% of the diisocyanate remains unreacted, then heating the reaction mixture above 130° F. but below the boiling point of the solvent until there is substantially no free isocyanate unreacted, the amount of diisocyanate employed being substantially equivalent to the hydroxyl of the oil diol ester.

3. Process in accordance with claim 1 wherein the diol ester is the alcoholysis product of linseed oil and pentaerythritol.

4. Process in accordance with claim 1 wherein the diol ester is the alcoholysis product of linseed oil and trimethylolpropane.

5. Process in accordance with claim 1 wherein the diol ester is the alcoholysis product of linseed oil and glycerine.

6. Process in accordance with claim 1 wherein the diisocyanate is tolylene diisocyanate.

7. Process in accordance with claim 1 wherein the diol ester is the alcoholysis product of soy oil and pentaerythritol.

8. Process in accordance with claim 1 wherein the diol ester is the alcoholysis product of safflower oil and pentaerythritol.

9. Process in accordance with claim 1 wherein the diol ester is that of tall oil acids.

10. The product of the method of claim 1.

References Cited in the file of this patent

UNITED STATES PATENTS

| | | |
|---|---|---|
| 2,358,475 | Pratt et al. | Sept. 19, 1944 |
| 2,769,826 | Yoho | Nov. 6, 1956 |